Jan. 9, 1923.
A. MARENGO ET AL.
TRAP.
FILED SEPT. 27, 1921.
1,441,442.
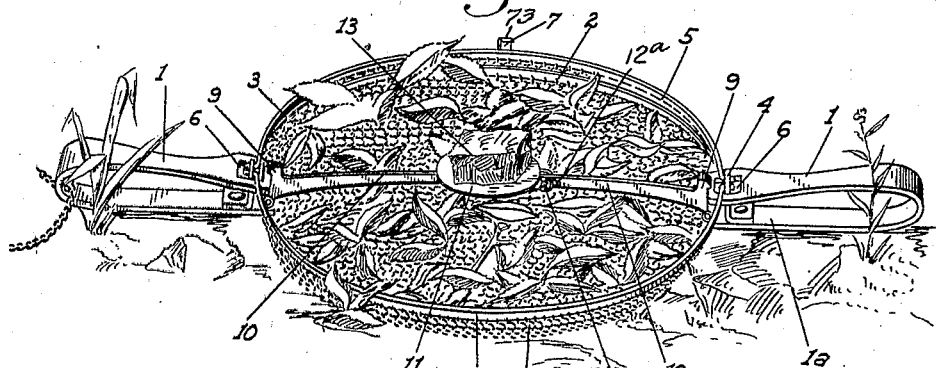
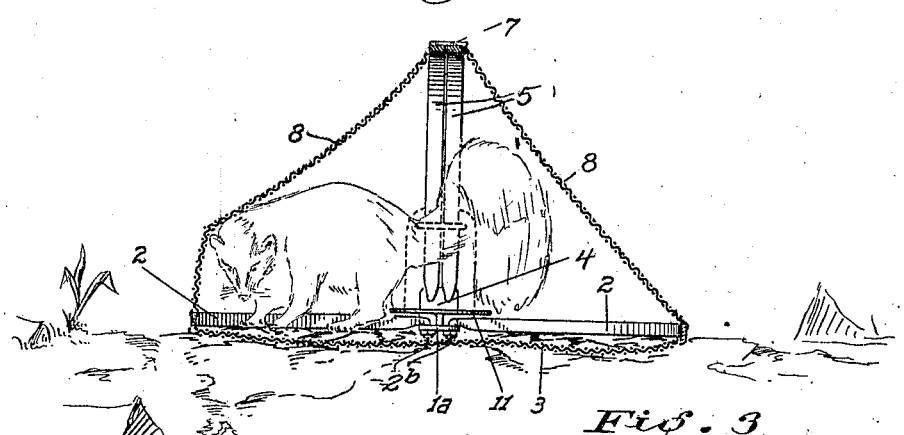
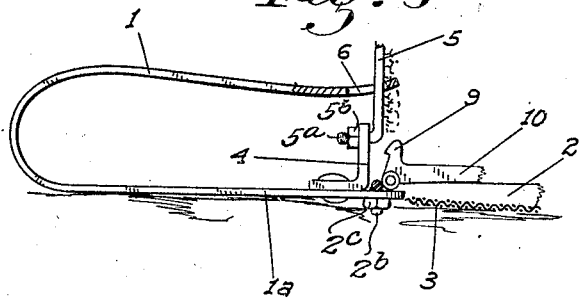
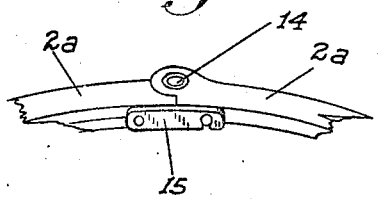
INVENTORS
August Marengo and
Joseph Marengo
BY *[signature]* ATTORNEY Patented Jan. 9, 1923.

1,441,442

UNITED STATES PATENT OFFICE.

AUGUST MARENGO AND JOSEPH MARENGO, OF STOCKTON, CALIFORNIA.

TRAP.

Application filed September 27, 1921. Serial No. 503,506.

*To all whom it may concern:*

Be it known that we, AUGUST MARENGO and JOSEPH MARENGO, citizens of the United States, residing at Stockton, county of San Joaquin, State of California, have invented certain new and useful Improvements in Traps; and we do declare the following to be a full, clear, and exact description of the same, reference being had to the accompanying drawings, and to the characters of reference marked thereon, which form a part of this application.

This invention relates to improvements in traps, the principal object being to provide a form of trap by means of which anything caught therein will not be harmed in any way. Our trap is therefore admirably adapted for use by trappers who are after the fur of the animals caught, and for those who desire to catch animals alive for exhibition purposes, such as for zoological gardens, circuses and the like.

The advantages of our trap for those in such lines of business will be evident, since it insures undamaged pelts in the first instance, and uninjured creatures in the second instance, who furthermore, having sustained no physical harm, are not in pain, and hence are not so apt to be infuriated at the trappers, and are more easily handled. Further, not being harmed, as stated, but only imprisoned, they are not so inclined to wreck the trap in their efforts to escape, nor of course can they escape by breaking or biting off of any caught and injured member, such as is frequently the case with the ordinary and cruel jaw form of trap.

Therefore, we have devised an article which is far more humanitarian than any of the ordinary forms now used.

Another object of our invention is to provide a form of trap by means of which, and with a standard design, not only animals of different sizes, but birds and fowl of different kinds may also be trapped, the only variation of one trap over another being in the size, strength and delicacy of trigger-action, depending on the purpose for which it is intended.

In any case, if the animal or birds and particularly the latter, should alight on the trap in any numbers, at the same time, not only one but several may be caught at the same time.

Here again, to those in the business the advantages of such a trap will be self evident without further elucidation.

A still further object of our invention is to provide a trap which, no matter what its size, may be easily and quickly dismounted or set up, so as to occupy a minimum of space when being transported.

A further object of the invention is to produce a simple and inexpensive device, and yet one which will be exceedingly effective for the purposes for which it is designed.

These objects we accomplish by means of such structure and relative arrangement of parts as will fully appear by a perusal of the following specification and claims.

In the drawings similar characters of reference indicate corresponding parts in the several views.

Fig. 1 is a perspective view of the trap, set and baited.

Fig. 2 is a cross section of the same, when sprung.

Fig. 3 is an enlarged side view of one of the spring actuating members, with its catch or trigger.

Fig. 4 is a fragmentary view of a modified form of trap-frame bar.

Referring now more particularly to the characters of reference on the drawings, the numeral 1 denotes a pair of arch-shaped spring members, arranged to be spaced apart and to then face each other. The lower members $1^a$ of these springs are firmly and rigidly yet detachably connected together by horizontally disposed bars 2, which have downwardly extending ends $2^b$ which project through said members $1^a$ in transversely spaced relation. These ends are threaded, and nuts $2^c$ are screwed thereon under the members $1^a$. In this manner, these parts may be readily dismounted from each other when desired, as for transportation and packing. The bars 2 outline an area preferably circular in shape, this area being covered by a flexible net 3 fastened to the bars in any suitable manner. This net is either of woven fabric such as a fish net, for birds and small animals, or of flexible steel link-mesh for larger animals, and forms the bottom of the trap, so that no animal caught, such as a rabbit, can burrow or dig its way out.

Brackets 4 are fixed to and project up from the members $1^a$ of the springs, in each of which are horizontally and removably pivoted, in a plane lengthwise of the springs, a pair of jaws 5, conforming in size and contour to the bars 2, whose ends 5ª are bent at right angles thereto, and project through said brackets, having nuts 5ᵇ on their ends beyond the brackets, so that said jaws may be as easily detached from the brackets and springs as the bars 2, and for the same purpose. The jaws 5 pass through slots 6 in the upper members of the springs, and when the springs are in a position of normal tension, that is not compressed, the slots engage the jaws 5 in such a manner that the latter lie in close alinement with each other and form a vertically disposed arch. At the highest point, one such jaw has a spring catch 7 fixed thereto, projecting outwardly thereof and at right angles thereto, said catch having a lip 7ª on its outer end adapted to automatically pass over the other jaw and engage the further edge of the same when said bars move together as above stated.

Between each corresponding pair of the members 2 and 5 and connected thereto is a flexible net 8 of the same construction as the net 3, and so woven that when the bars 5 lie adjacent each other a substantially semi-spherical enclosure will be formed. Of course the netting is not connected to the bars for the extent of the latter on which the springs slide, but the openings thus left will be of insufficient size to permit of the escape of the animals for which this trap is intended.

When the springs are contracted or compressed to their fullest extent, the upper ends of the brackets 4 will project through the slots 6, and the jaws 5 may then be turned away from each other and lie on the corresponding bars 2, the respective nets 8 folding up therebetween. This is the position assumed by these members when the trap is set ready to be sprung, the springs being held in this compressed position by means of hooks 9 which are pivoted to the spring members 1ª and engage the ends of the upper spring members.

Rigid arms 10 are formed with the hooks and extend toward each other and hence toward the center of the trap area, preferably but a slight distance from the bottom net 3. One of these arms has a horizontal bait plate or dish 11 fixed thereon at its free end, the other arm being arranged to be removably connected to the opposite end of the plate as by a removable pin or bolt 12 passed through a slot 12ª in said arm after the hook on the other arm has engaged its spring member.

The plate 11 is for the purpose of supporting bait 13, and may of course be of any shape and size suitable for its purpose and the kind of bait to be used.

For large traps, the bars 2ª are made in two or more sections hinged together as at 14 in Fig. 4 in such a manner that one section may fold over onto the other so as to occupy a minimum of space when so folded. When outstretched, these sections are prevented from undesired collapse by locking means 15 of any suitable character mounted on the bars adjacent the hinges.

In any case, the bars being separable from the spring members, and readily detached therefrom as will be obvious from an inspection of the drawing, the trap may be packed into a relatively small space for transportation.

In operation, the various parts are of course first assembled, the springs compressed, and the trigger hooks 9 engaged therewith in the order previously given, and some suitable form of bait placed on the plate 11.

Any animal then walking onto the net 3 within reach of the bait, and attempting to eat the latter, will sooner or later depress the plate, causing both hooks to be withdrawn from their springs simultaneously, which in turn causes the jaws 5 to fly upwardly and complete the semispherical enclosure, inside of which the animal is imprisoned, but entirely unharmed as in a cage.

In the case of fowl or birds of any kind, a more sensitive trigger mechanism would of course be used, and the bait would be scattered promiscuously over the whole ground area of the trap, so as to attract a large number of birds, any one of which, by alighting on the plate or on either hook-arm, will cause the trap to be sprung, trapping all the birds which were in the area thus enclosed at the time.

From the foregoing description it will be readily seen that we have produced such a device as substantially fulfils the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent, is:—

1. A trap including opposed U-shaped springs, one face of each being adapted to rest on the ground, horizontally disposed bars extending between the springs and enclosing a certain ground area therewith, downwardly projecting ends on said bars removably projecting through the lower members of the springs, means on said ends under the springs for holding the ends of the bars removably in place, vertical brackets secured on the lower spring members inwardly of the bar-ends, a pair of jaws extending between the springs and through slots in the upper members thereof, the ends of said jaws being bent to lie in a horizontal plane and being removably and turnably mounted in the brackets, and removable means on said last named ends inwardly of the brackets for holding said ends against undesired removal.

2. A trap including opposed springs, detachable bars connecting the springs and enclosing a certain ground area therewith, and a pair of detachable and curved jaws extending between the springs and adapted to be outstretched when the springs are compressed and to assume a vertical position adjacent each other when the springs are released.

3. A trap including opposed springs, bars extending between the springs and enclosing a certain ground area therewith, the ends of said bars being turned vertically and removably passed through the springs whereby to hold said bars against movement relative to the springs, and jaws operatively connected with the springs to be actuated thereby.

In testimony whereof we affix our signatures.

AUGUST MARENGO.
JOSEPH MARENGO.